(12) United States Patent
Ohara

(10) Patent No.: US 6,694,376 B1
(45) Date of Patent: Feb. 17, 2004

(54) DATA COMMUNICATION SYSTEM HAVING AN INTERFACE DEVICE DETERMINING WHETHER TRANSMITTED DATA TO BE LOCALLY PROCESSED OR TO BE TRANSMITTED TO A RECEPTION DEVICE FOR PROCESSING

(75) Inventor: Kiyotaka Ohara, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/232,811

(22) Filed: Jan. 19, 1999

(30) Foreign Application Priority Data

Jan. 19, 1998 (JP) .......................................... P10-008112

(51) Int. Cl.⁷ .............................................. G06F 15/16
(52) U.S. Cl. ...................... 709/250; 709/238; 370/220; 370/230; 370/389
(58) Field of Search ................................ 709/250, 238; 370/230, 389, 220

(56) References Cited

U.S. PATENT DOCUMENTS

| | | | | |
|---|---|---|---|---|
| 4,604,683 A | * | 8/1986 | Russ et al. ................... | 364/200 |
| 4,744,077 A | * | 5/1988 | Fadem et al. ................ | 370/230 |
| 5,323,393 A | * | 6/1994 | Barrett et al. ........... | 340/825.22 |
| 5,455,688 A | * | 10/1995 | Furukawa et al. ........... | 358/442 |
| 5,491,720 A | * | 2/1996 | Davis et al. ................. | 375/222 |
| 5,613,096 A | * | 3/1997 | Danknick .................... | 709/236 |
| 5,613,159 A | * | 3/1997 | Colnot ........................ | 710/11 |
| 5,640,394 A | * | 6/1997 | Schrier et al. .............. | 370/389 |
| 5,727,149 A | * | 3/1998 | Hirata et al. ................ | 709/250 |
| 5,754,552 A | * | 5/1998 | Allmond et al. ............ | 370/465 |
| 5,758,127 A | * | 5/1998 | MacAulay et al. .......... | 710/71 |
| 5,935,262 A | * | 8/1999 | Barrett et al. ............... | 714/46 |
| 6,108,782 A | * | 8/2000 | Fletcher et al. ............. | 713/153 |
| 6,178,207 B1 | * | 1/2001 | Richards et al. ............ | 375/259 |
| 6,198,727 B1 | * | 3/2001 | Wakeley et al. ............ | 370/247 |

* cited by examiner

*Primary Examiner*—Nabil El-Hady
(74) *Attorney, Agent, or Firm*—Oliff & Berridge, PLC

(57) ABSTRACT

A data communication system including a manager computer G capable of transmitting transmission firmware files to be written to a storage area in the ROM of a network interface controller (NIC) by TFTP and transmission firmware files to be written to a storage area in the ROM of a printer by LPR. Based on whether the files were transmitted by TFTP or LPR, the NIC determines whether to process them itself or direct them to the printer. Accordingly, such data can be reliably directed according to the type of protocol used for transmission, without being assigned an identifier.

11 Claims, 19 Drawing Sheets

FIG.8

| ICON | DEVICE CLASS | DEVICE NAME | DEVICE STATUS | DEVICE FIRMWARE VERSION | NIC DEVICE NAME | NIC FIRMWARE VERSION | IP ADDRESS |
|---|---|---|---|---|---|---|---|
| | LASER PRINTER | 1660 | READY | Vr3 | 2010 | Vr3 | 133.151.12.30 |
| | LASER PRINTER | 1660 | READY | Vr1 | 2010 | Vr3 | 133.151.12.31 |
| | LASER PRINTER | 1661 | Cover-Open | Vr2 | 2100 | Vr2 | 133.151.56.70 |
| | LASER PRINTER | 1660 | READY | Vr3 | 2010 | Vr3 | 133.151.12.34 |
| | LASER PRINTER | 1661 | READY | Vr2 | 2100 | Vr2 | 133.151.56.78 |
| | COLOR LASER PRINTER | 2400 | READY | Vr1 | 2010 | Vr1 | 133.151.24.68 |
| | COLOR SCANNER | 5000 | READY | Vr3 | 2210 | Vr3 | 133.151.13.57 |

Menu buttons: DEVICE FIRMWARE UPDATE (202), NIC FIRMWARE UPDATE (203), SELECT ALL OF SAME TYPE (204), END (205). Window 200, list area 201.

FIG.9

| ICON | DEVICE FIRMWARE UPDATE | NIC FIRMWARE UPDATE | SELECT ALL OF SAME TYPE | END | | |
|---|---|---|---|---|---|---|
| ICON | DEVICE CLASS | DEVICE NAME | DEVICE STATUS | DEVICE FIRMWARE VERSION | NIC DEVICE NAME | NIC FIRMWARE VERSION | IP ADDRESS |
| | LASER PRINTER | 1660 | READY | Vr3 | 2010 | Vr3 | 133.151.12.30 |
| | LASER PRINTER | 1660 | READY | Vr1 | 2010 | Vr3 | 133.151.12.31 |
| | LASER PRINTER | 1661 | Cover-Open | Vr2 | 2100 | Vr2 | 133.151.56.70 |
| | LASER PRINTER | 1660 | READY | Vr3 | 2010 | Vr3 | 133.151.12.34 |
| | LASER PRINTER | 1661 | READY | Vr2 | 2100 | Vr2 | 133.151.56.78 |
| | COLOR LASER PRINTER | 2400 | READY | Vr1 | 2010 | Vr1 | 133.151.24.68 |
| | COLOR SCANNER | 5000 | READY | Vr3 | 2210 | Vr3 | 133.151.13.57 |

FIG.10

| ICON | DEVICE CLASS | DEVICE NAME | DEVICE STATUS | DEVICE FIRMWARE VERSION | NIC DEVICE NAME | NIC FIRMWARE VERSION | IP ADDRESS |
|---|---|---|---|---|---|---|---|
| | LASER PRINTER | 1660 | READY | Vr3 | 2010 | Vr3 | 133.151.12.30 |
| | LASER PRINTER | 1660 | READY | Vr1 | 2010 | Vr3 | 133.151.12.31 |
| | LASER PRINTER | 1661 | Cover-Open | Vr2 | 2100 | Vr2 | 133.151.56.70 |
| | LASER PRINTER | 1660 | READY | Vr3 | 2010 | Vr3 | 133.151.12.34 |
| | LASER PRINTER | 1661 | READY | Vr2 | 2100 | Vr2 | 133.151.56.78 |
| | COLOR LASER PRINTER | 2400 | READY | Vr1 | 2010 | Vr1 | 133.151.24.68 |
| | COLOR SCANNER | 5000 | READY | Vr3 | 2210 | Vr3 | 133.151.13.57 |

Buttons: DEVICE FIRMWARE UPDATE (202) | NIC FIRMWARE UPDATE (203) | SELECT ALL OF SAME TYPE (204) | END (205)

DATA COMMUNICATION SYSTEM HAVING AN INTERFACE DEVICE DETERMINING WHETHER TRANSMITTED DATA TO BE LOCALLY PROCESSED OR TO BE TRANSMITTED TO A RECEPTION DEVICE FOR PROCESSING

BACKGROUND OF THE INVENTION

1. Field of the Invention

The present invention relates to a data communication system having a data reception device that receives at least a portion of data transmitted from a data transmission device via an interface device.

2. Description of the Prior Art

In the past, this type of data communication system employed a relatively simple component such as a buffer or the like as the interface device. However, in recent years manufacturers have given these interface devices a data processing capability by providing them with microcomputers and the like. In this type of data communication system, some data can be processed by only the interface device without the need to transmit that data to the data reception device. Therefore, it is necessary to determine whether data transmitted from the data transmission device should be processed by the interface device or by the data reception device. For example, when firmware or the like that is to be written to a programmable ROM in the interface device is transmitted from the data transmission device, it is necessary to distinguish this data from other data in order to prevent the data from being mistakenly written to the programmable ROM in the data reception device.

One proposal for achieving this objective is to assign an identifier to data transmitted from the data transmission device in order to indicate whether the data should be processed by the interface device or processed by the data reception device. With this configuration, the interface device references that identifier and determines by itself whether to transfer the data to the data reception device or to process the data itself without transferring it to the data reception device. However, the process for assigning an identifier with the data transmission device is relatively troublesome and lowers the processing efficiency of that device.

SUMMARY OF THE INVENTION

In view of the foregoing, it is an object of the present invention to provide a data communication system for determining whether data transmitted from the data transmission device should be processed by the interface device or by the data reception device without assigning an identifier to the data.

It is another object of the present invention to provide an interface device and storage medium for achieving this data communication system.

In order to attain these and other objects, the data communication system is provided with a data transmission device for transmitting data, an interface device for receiving data transmitted from the data transmission device, and a data reception device for receiving via the interface device at least a portion of the data transmitted from the data transmission device. The data transmission device is provided with determining means for determining whether the transmitted data is data to be processed by the interface device or data to be processed by the reception device; and a data transmitting device for transmitting, based on the results of the determination, data to be processed by the interface device using a first communication protocol and data to be processed by the data reception device using a second communication protocol different from the first communication protocol. The interface device is provided with data processing means for processing data transmitted from the data transmission device by the first communication protocol rather than transferring the data to the data reception device; and data transferring means for transferring data to the data reception device when the data is transmitted from the data transmission device by the second communication protocol.

In a data communication system of this construction, the determining means of the data transmission device determines whether data to be transmitted by the data communication device should be processed by the interface device or the data reception device. Based on the results of this determination, the data transmitting means of the data transmission device transmits data to be processed by the interface device using the first communication protocol and data to be processed by the data reception device using the second communication protocol different.

When data is transmitted from the data transmission device using the first communication protocol, the data processing means in the interface device processes the data without sending it to the data reception device. When data is transmitted from the data transmission device using the second communication protocol, the data transferring means transfers that data to the data reception device.

Therefore, the interface device of the present invention determines, based on the communication protocol in association with the data, whether to transfer the data received from the data transmission device to the data reception device or to process the data itself without transferring the data to the data reception device. Hence, in the present invention it is possible to determine whether data should be processed by the interface device or by the data reception device without the need to assign additional data (for example, identifiers) to the transmitted data for the purpose of making this determination. Accordingly, the present invention not only simplifies processing in the data transmission device and improves processing speed, but also simplifies the construction of the data transmission device, thereby reducing production costs.

According to another aspect of the present invention, each of the interface device and data reception device is further provided with a programmable ROM that includes a rewritable storage area: a CPU for executing processes based on processing programs stored in the storage area; and a RAM for temporarily storing data necessary for such CPU processes. Data transmitted using the first communication protocol and the second communication protocol include new processing programs to be written to the programmable ROM in either the interface device or the data reception device.

By writing a new processing program to the programmable ROM of the interface device and data reception device of the present invention, it is possible to improve the functions of both. However, if processing programs intended to be written to the programmable ROM of the interface device are mistakenly written to the programmable ROM of the data reception device, or processing programs intended to be written to the programmable ROM of the data reception device are mistakenly written to the programmable ROM of the interface device, the respective devices will not operate properly and will hinder proper functioning of the entire communication system.

To prevent this from happening in the present invention, new processing programs to be written to programmable ROM can be reliably directed according to the configuration described above. Accordingly, not only are the effects of the invention described more remarkable, but also we can see new effects, such as the capability to satisfactorily prevent the occurrence of mistaken operations in the interface device and the data reception device.

According to another aspect of the present invention, the data reception device is provided with an image forming device for forming an image on a recording medium based on image data received via the interface device. The second communication protocol is the same communication protocol used when transmitting image data to the data reception device.

As a result, the data receiving device of the present invention is capable of forming an image on a recording medium according to the image forming device based on image data received via the interface device. Further, in the present invention the second communication protocol is the same protocol used when the data reception device receives image data. For this reason, the interface device can direct data by transferring data received using the second transmission to the data reception device, regardless of the type of data.

Therefore, it is not only possible to simplify the process and construction of the interface device and further improve the processing speed, but also to reduce production costs.

According to another aspect of the present invention, when the data is a new processing program to be written to programmable ROM in either the interface device or the data reception device, the data transmission device assigns a password to the new processing program before transmitting the data. The interface device or data reception device writes the new processing program to the associated programmable ROM only when such a password has been assigned to the data.

As a result, it is possible to sufficiently prevent data for an undesirable processing program or data other than a processing program to be written to the programmable ROM as a new processing program. Hence, it is possible to more adequately prevent a processing program intended for another device to be mistakenly written to the ROM device. Accordingly, reliability of the communication system can be further improved.

According to another aspect of the present invention, either the first communication protocol or the second communication protocol is either TFTP or LPR and the password described above is written in place of the pathname data for the transmission source file.

Accordingly, a more simplified data system can be achieved by simply writing the password in place of the pathname of the transmission source file. Therefore, in addition to the effects described above, it is possible to further simplify the construction of the communication system and increase reliability.

According to another aspect of the present invention, the interface device is connected to a communication line and transfers data received from the communication line to the data reception device. The interface device is further provided with data processing means for processing data received from the communication line by the first communication protocol without transferring that data to the data reception device; and data transferring means for transferring data to the data reception device when such data is received from the communication line by the second communication protocol different from the first communication protocol.

In other words, the interface device is provided with data processing means and data transferring means. For this reason, the data communication system can be of a simple construction, wherein the data reception device is connected via the interface device to a communication line through which data is transmitted from the data transmission device. A communication system of this construction has the same effects as those described above.

According to further aspect of the present invention, a recording medium which stores computer programs for controlling the data transmission device. The computer programs stored in the storage medium include a determining program for determining whether the transmitted data is data to be processed by the interface device or data to be processed by the data reception device; and a data transmitting program for transmitting based on the results of determination data to be processed by the interface device using a first communication protocol and data to be processed by the data reception device using a second communication protocol different from the first communication protocol.

BRIEF DESCRIPTION OF THE DRAWINGS

The above and other objects, features and advantages of the present invention will become more apparent from the following description when taken in conjunction with the accompanying drawings in which:

FIG. 8 is an explanatory diagram showing an example of a device list screen corresponding to the device data;

FIG. 9 is an explanatory diagram showing the device list screen when one device has been selected;

FIG. 10 is an explanatory diagram showing the device list screen when all devices of a particular type have been selected;

FIG. 13(*b*) is an explanatory diagram showing the transfer parameter of TFTP used in the embodiment of the present invention;

FIG. 15(b) is an explanatory diagram showing a copying operation of rewrite program to a RAM;

FIG. 15(c) is an explanatory diagram showing a rewriting operation of the memory areas in the printer;

DETAILED DESCRIPTION OF THE PREFERRED EMBODIMENT

A data communication system according to a preferred embodiment of the present invention will be described while referring to the accompanying drawings. The embodiment described below is a communication system that includes a plurality of printers as terminal units and a plurality of computers for using the plurality of printers to perform printing processes. In this embodiment, the present invention is applied to a data communication system for centrally executing the management of firmware and the like used to control the printers.

First, the construction of the communication system S of the present embodiment will be described with reference to FIG. 1.

Figure 1:
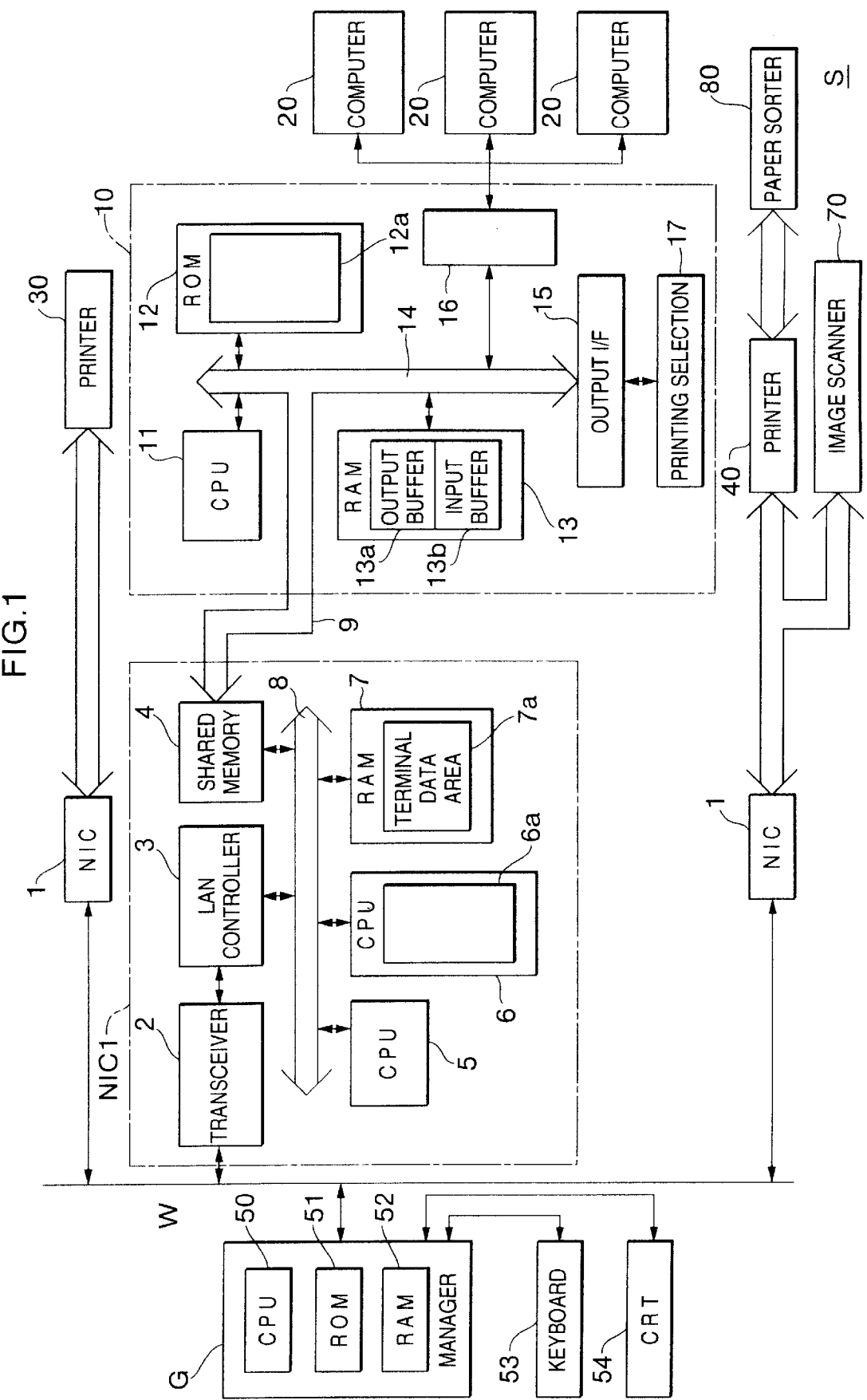
FIG. 1 is a block diagram showing the construction of a data communication system according to the embodiment of the present invention.

As shown in FIG. 1, the communication system S includes a manager G (manager computer) as a data transmission device; a network W such as a telephone line or a LAN; a plurality of NICs 1 (network interface controllers) as interface devices; printers 10, 30, and 40 as the data reception devices; a plurality of computers 20 connected to the printer 10; an image scanner 70 connected in parallel to the printer 40; and a paper sorter 80 connected in series to the printer 40. Here, the printers 10, 30, and 40 are different models from one another.

The manager G is a personal computer well known in the art. The manager G includes a CPU 50, a ROM 51, and a RAM 52 and is connected to a keyboard 53, a CRT 54, and the like.

Each of the NIC 1 includes a transceiver 2, a LAN controller 3, a shared memory 4, a CPU 5, a ROM 6, a RAM 7, and a bus 8. The ROM 6 is configured with a programmable ROM, such as flash ROM, and has a rewritable storage area 6a. The RAM 7 includes a terminal data area 7a.

The printer 10 includes a CPU 11, a ROM 12, a RAM 13, a bus 14, an output interface 15, an input interface 16, and a printing section 17 for forming images on a recording paper. The ROM 12 is configured with a programmable ROM, such as flash ROM, and has a rewritable storage area 12a. The RAM 13 includes an output buffer 13a and an input buffer 13b. The printer 10 is connected to the NIC 1 via a connecting line 9 connected to the bus 14 and is connected to each of the computers 20 via the input interface 16.

Next, the general operations of the communication system S will be described with reference to FIG. 1. Although the following description will be given for processes executed by the NIC 1 and the printer 10, the same operations are executed between other NICs 1 and the printers 30 and 40.

The CPU 50 in the manager G generates data to be transmitted to either the printer 10 or the NIC 1 connected to the printer 10 and transmits the data to the transceiver 2 of the NIC 1 via the network W. At this time, data to be processed by the NIC 1 is transmitted by TFTP (Trivial File Transmission Protocol); data to be processed by the printer 10 is transmitted by LPR (Line Printer Remote); and data with which a specific processing device need not be specified is transmitted by UDP (User Datagram Protocol). On receiving data, the transceiver 2 demodulates the data signals and outputs the data to the bus 8 via the LAN controller 3. Here, the LAN controller 3 controls data transmission and reception with the manager G via the network W.

When data received by the NIC 1 has been transmitted using TFTP, the CPU 5 processes the data using information stored in the ROM 6. At this time, the RAM 7 temporarily stores information that can be read by the CPU 5 when necessary for processing. Subsequently, the CPU 5 returns the results of the process to the manager G via the LAN controller 3, transceiver 2, and network W.

When data received by the NIC 1 has been sent by LPR, the CPU 5 transfers this data to the printer 10 via the shared memory 4 and connecting line 9. After writing data to the shared memory 4, the CPU 5 issues an interrupt to the CPU 11 via signal lines (not shown) causing the latter to process the data. Control programs that the CPU 5 requires to perform this process are stored in advance in the ROM 6.

The shared memory 4 is a memory used for temporarily storing information that should be shared between the NIC 1 and the printer 10 during processing.

When data transferred from the NIC 1 to be processed in the printer 10 (for example, data transmitted from the manager G using LPR) is input into the printer 10 via the connecting line 9, the CPU 11 processes this data using information stored in the ROM 12 after obtaining the data via the bus 14. Subsequently, the CPU 11 returns the results of the processing to the NIC 1 via the bus 14, connecting line 9, and shared memory 4. At this time, the RAM 13 is used to temporarily store information that the CPU 11 requires for processing. Control programs that the CPU 11 requires to process this data are previously stored in the ROM 12.

After receiving the processing results for data processed by the printer 10, the NIC 1 transfers these processing results without change to the manager G via the network W.

Image data and other data output from the computers 20 to be printed on the printer 10 are introduced into the printer 10 via the input interface 16 and stored in the input buffer 13b via the bus 14. This data is developed into print data and temporarily stored in the output buffer 13a. The data is then output via the bus 14 and the output interface 15 to the printing section 17, and a printing process based on this data is executed. When other data such as image data to be printed is output to the printer 10 from another computer (not shown), the data is introduced into the input buffer 13b of the printer 10 via the NIC 1 on the network W and is subsequently output as described above. The printer 10 executes its normal print processes under control of the CPU 11 and based on control programs stored in the ROM 12.

Although the printers 10, 30, and 40 included in the communication system S are each provided with a similar NIC 1, the printers themselves are of different models. More specifically, device data described later that supports differences in the print mechanism and handling data for different models is stored in the ROM 12 of each printer. The device data is different for each printer. In addition, other printers (not shown) are connected to the network W via NICs of models different from the NIC 1.

As described above, the rewritable storage area 6a and rewritable storage area 12a of the ROM 6 and ROM 12 respectively are configured to be rewritable. Hence, by rewriting firmware and other processing programs stored in this portion of memory, it is possible to update the functions of the printer 10.

Next, this updating process will be described.

Figure 2:
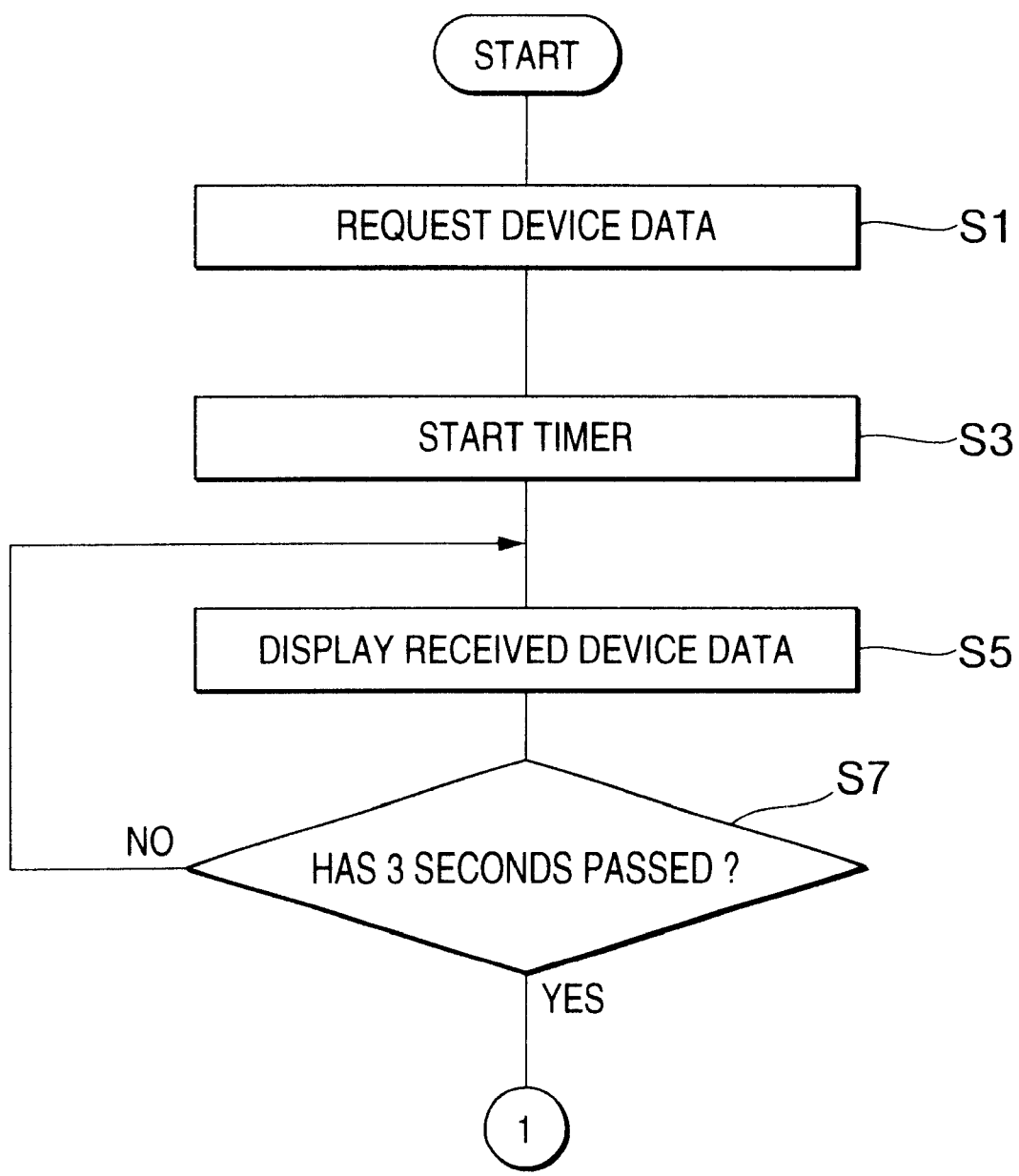
FIG. 2 is a flowchart showing an updating process performed by a manager computer.
Figure 3:
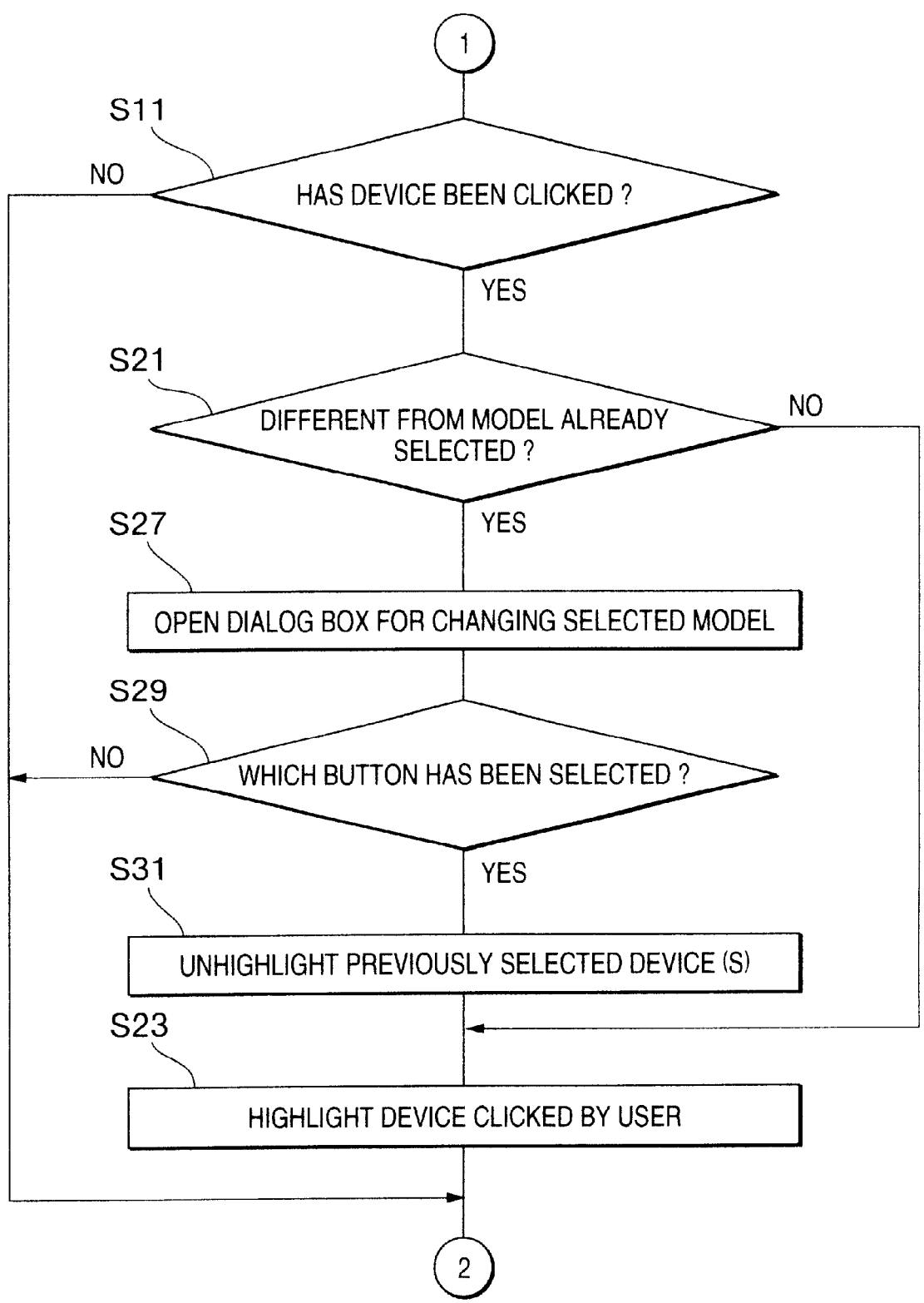
FIG. 3 is a flowchart showing the continuation of the updating process.
Figure 4:
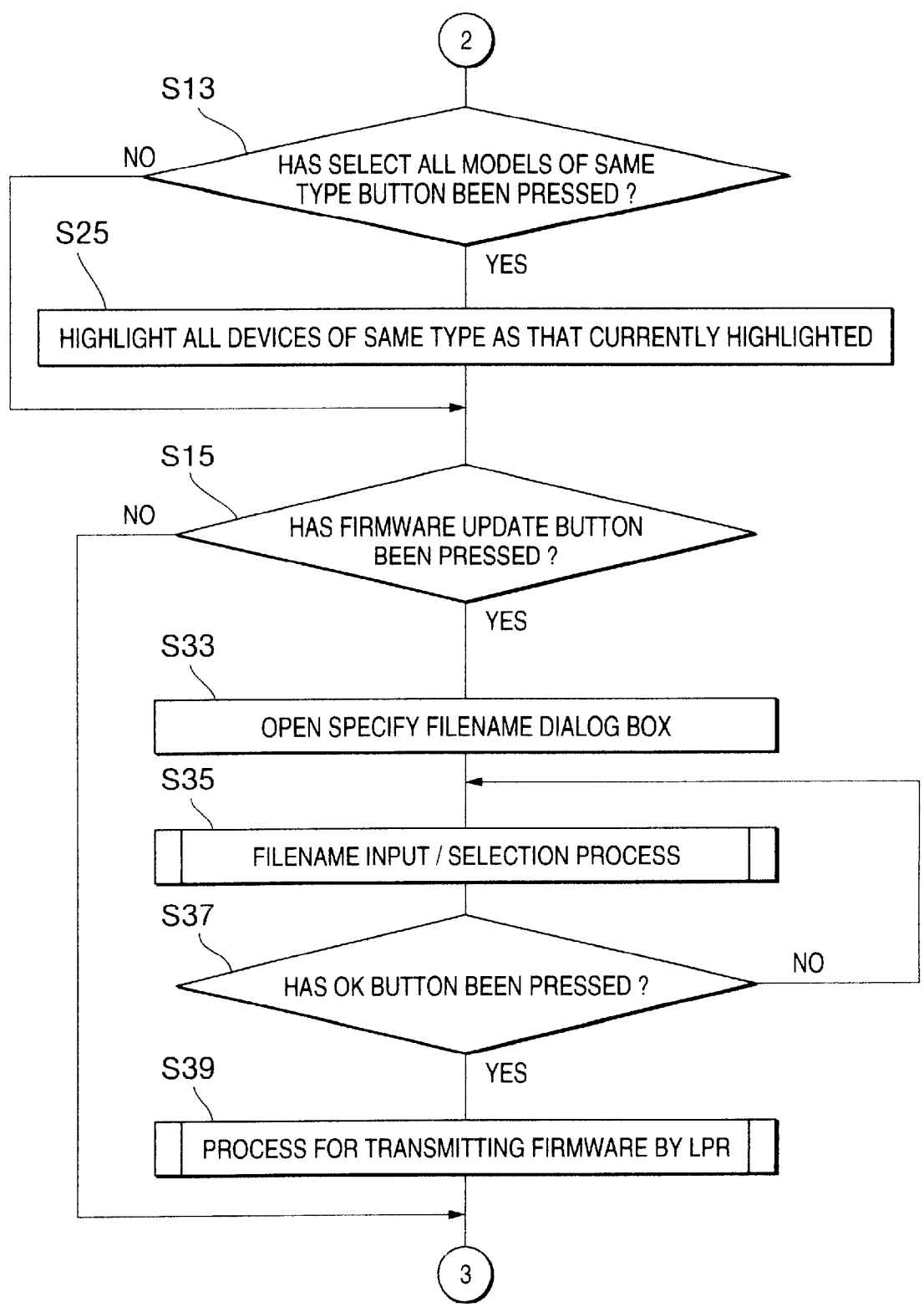
FIG. 4 is a flowchart showing the continuation of the updating process.
Figure 5:
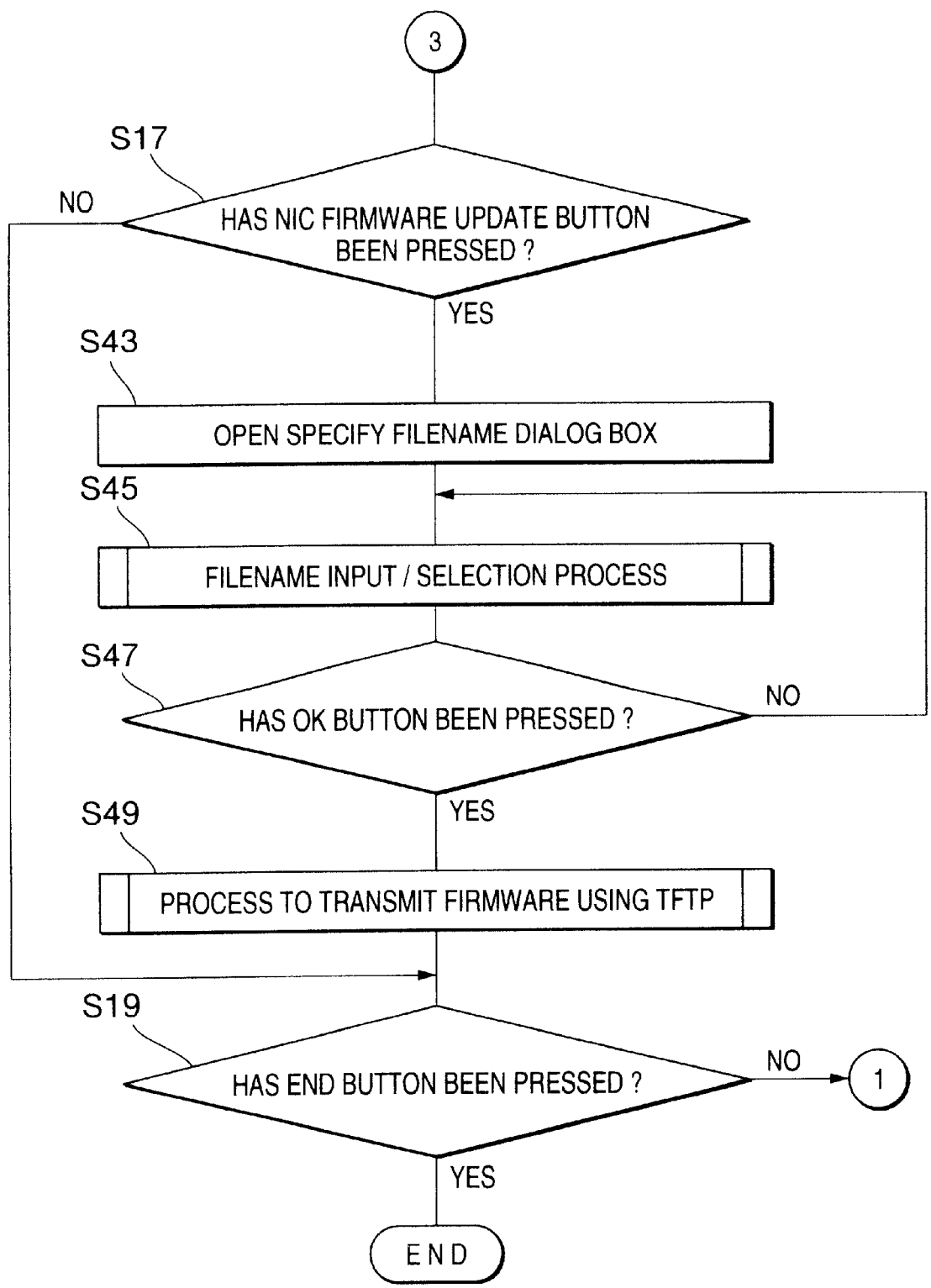
FIG. 5 is a flowchart showing the continuation of the updating process.

When a desired updating application program is started up in the manager G, the CPU 50 executes the updating process shown in FIGS. 2–6. As shown in FIG. 2, in S1 the CPU 50 transmits by UDP a broadcast packet requesting device data to all of the printers connected to the network W. In S3, a timer capable of timing at least 3 seconds is started. In S5, device data is received from each printer via the network W, and the received device data is displayed on the screen of the CRT 54. The process of S5 is then repeated until it is determined in S7 that 3 seconds have elapsed since the timer was started. When 3 seconds have elapsed ("yes" in S7), the process continues from S11.

When the printer 10 receives the broadcast packet, a routine (not shown) is initiated. In this routine, the printer 10 acquires device data from the NIC 1 to which it is connected. This data includes the device name of the NIC 1, the firmware version of the NIC 1, and the like (NIC device name, NIC firmware version, etc.). Next, the printer 10 generates a random number and waits for several milliseconds based on that random number. Subsequently, the printer 10 returns the device data for the NIC 1 along with its own device class, device name, status, firmware version, and the like to the manager G. It is also possible for the printer 10 to acquire the device data for the NIC 1 when the printer 10 is powered on, for example, or to acquire device data for other printers and NICs connected to the network w and return such data as well.

Figure 7:
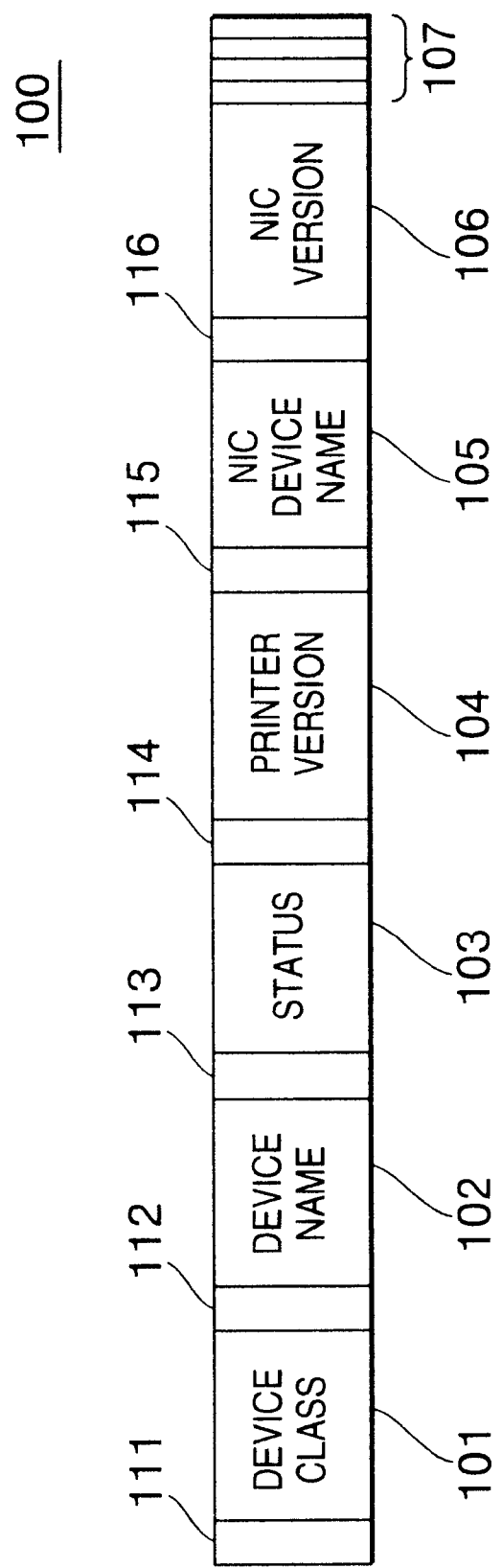
FIG. 7 is an explanatory diagram showing the format of device data returned from the printer.

As a result, device data from each printer is returned to the manager G via the network W at staggered intervals according to the random numbers. The received device data is displayed in the CRT 54 by the manager G in the process of S5. FIG. 7 is an explanatory diagram showing the format of a device data 100 returned from the printer 10. FIG. 8 is an explanatory diagram showing an example of a device list screen 200 for the CRT 54 that corresponds to this device data 100.

As shown in FIG. 7, the device data 100 includes a list of device data for the printer 10 and the NIC 1. The device data for the printer 10 includes a device class 101 representing the type or class of the device, such as a laser printer or color printer; a device name 102 assigned to each device model; a status 103 expressing the state of the printer 10; and a printer version 104 indicating the version of the firmware. The device data for the NIC 1 includes a NIC device name 105 and a NIC version 106. The device data 100 also includes an IP address 107 assigned to the printer 10. At the head of each of the device class 101, device name 102, status 103, printer version 104, NIC device name 105, and NIC version 106 data is added a device class length 111, a device name length 112, a status length 113, a printer version length 114, an NIC device name length 115, and an NIC version length 116, respectively, representing the lengths of each data.

After receiving this device data 100, the CPU 50 displays in the process of S5 a device list 201, as shown in FIG. 8. The device list 201 is a list including values corresponding to the device class 101, device name 102, status 103, printer version 104, NIC device name 105, NIC version 106, and IP address 107 (device class, device name, device status, firmware version, NIC device name, NIC firmware version, and IP address) displayed to the right of icons corresponding to the device class 101.

In addition to a printer, a scanner is also listed in the device list 201 shown in FIG. 8. Both the printer and scanner are referred to as devices. The value corresponding to the printer version 104 of the device data 100 returned from the printer 10 is also displayed in the column under the device firmware version. In the following description, devices of the same time are supported by NICs of the same time.

In the top portion of the device list 201 displayed in the device list screen 200 is a row of buttons, including a device firmware update button 202 that is pressed in order to update the device version; an NIC firmware update button 203 that is pressed when updating the NIC version; a select all of same type button 204 that is pressed when selecting all devices of the same type as the object of the update; and an end button 205 that is pressed when quitting the updating process. Each device displayed in the device list 201 is a button that responds when the user clicks the icon with a mouse.

After displaying this device list screen 200 in the process of S5, the CPU 50 executes a process beginning in S11 based on a button that the user clicks in the device list screen 200. That is, in S11 the CPU 50 determines whether a device displayed in the device list 201 has been clicked. If a device has not been clicked ("no" in S11), the process transfers to S13. In S13, the CPU 50 determines whether the select all of same type button 204 has been pressed. If this button has not been pressed ("no" in S13), the process jumps to S15. In S15, the CPU 50 determines whether the device firmware update button 202 has been pressed in the same way. If the device firmware update button 202 has not been pressed ("no" in S15), the process jumps to S17. In S17, the CPU 50 determines whether the NIC firmware update button 203 has been pressed. If the NIC firmware update button 203 has not been pressed ("no" in S17), then the process jumps to S19. In S19, the CPU 50 determines whether the end button 205 has been pressed. If the end button 205 has not been pressed ("no" in S19), then the process returns to S11. In other words, after the device list screen 200 is displayed, the CPU 50 processes the loop from S11–S19 in a wait state until one of the above operations is performed.

Normally, when the device list screen 200 is displayed, the user selects a device to be updated. The first time a device in the device list screen 200 is clicked, the CPU 50 recognizes the click ("yes" in S11), and the process jumps to S21. In S21, the CPU 50 determines whether the clicked device is a model different than models already selected. Since the device is the first to be selected, that is, no other devices have been selected yet ("no" in S21), the process jumps to S23. In S23, the display of the clicked device is highlighted. For example, if the laser printer displayed at the top of the device list 201 (device name: 1660, NIC device name: 2010) is clicked, the device list screen 200 will change as shown in FIG. 9. After the display is highlighted in S23, the process returns to the loop S11–S19. The highlighted device will be a target for updating in the updating process described later.

Next, if the select all of same type button 204 has been pressed ("yes" in S13), the process continues at S25. In S25, all devices of the same type as the highlighted device are themselves highlighted. The process then returns to the loop S11–S19. If the select all of same type button 204 is pressed and the device list screen 200 is in the state shown in FIG. 9 with the laser printer at the top of the device list 201 highlighted, then all laser printers of the same time as the highlighted laser printer will be highlighted, as shown in FIG. 10. Hence, it is possible to specify all devices of the same type for updating by pressing the select all of same type button 204.

It is also possible to specify devices individually as objects of updating for the updating process. When specifying just one device, the user clicks on the desired device, as described above. When specifying a plurality of devices individually, the user clicks on each of the devices.

In the latter case, each time the user clicks on a device after clicking on a first device, the CPU 50 determines in S21 whether the most recently clicked device is of a different model from the devices already highlighted. In the updating process to be described later, after a device has been selected the firmware is transmitted to that device to perform the updating process. In general, however, the types of models appropriate for a given firmware are limited. For this reason, when a plurality of devices of different models are selected, it is difficult to determine the compatibility of the firmware or to perform the process corresponding to pressing the select all of same type button 204 described above. Therefore, if a device of a different model from that already selected is clicked ("yes" in S21), the process continues at S27.

Figure 11:
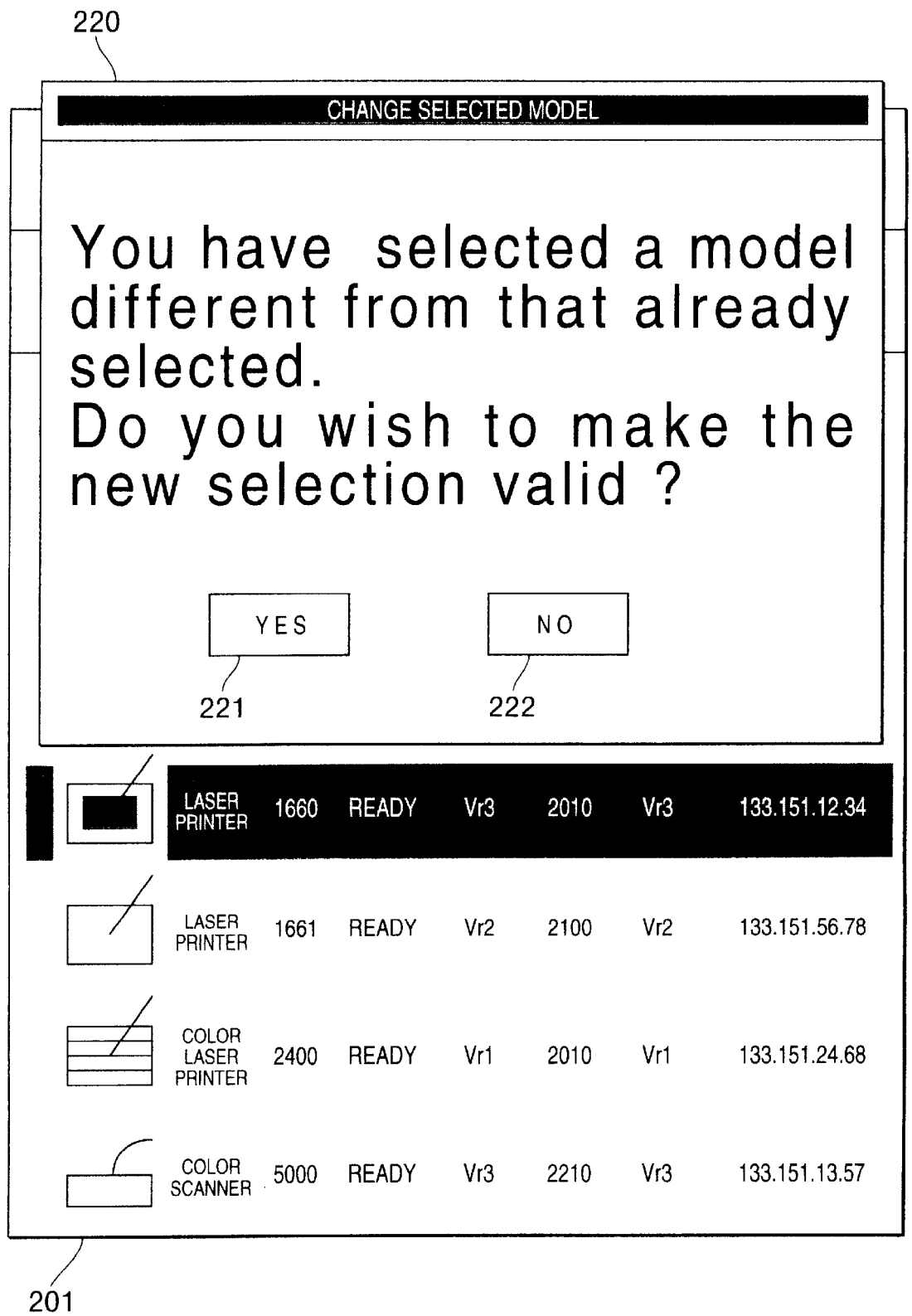
FIG. 11 is an explanatory diagram showing an example of a Change Selected Model dialog box.

In S27, a change selected model dialog box 220 shown in FIG. 11 is opened and displayed over the top of the device list screen 200. As shown in FIG. 11, the change selected model dialog box 220 includes a message that reads "You have selected a model different from that already selected. Do you wish to make the new selection valid?" as well as a Yes button 221 and a No button 222. If the user presses the Yes button 221 ("yes" in S29), then the previously selected device is unhighlighted in S31, and the newly selected device is highlighted in S23 described above. Processes in the loop S11–S19 are resumed.

With the process described above, the previous selection is made invalid and only the newly selected device is made valid. However, if the user presses the No button 222 in the change selected model dialog box 220 ("no" in S29), no changes are made and the processes in the loop S11–S19 are resumed. In this case, the previously selections remain valid, while the newly selected device is not made valid. When either the Yes button 221 or the No button 222 is pressed, the CPU 50 closes the change selected model dialog box 220 and displays the device list screen 200 in its entirety.

On the other hand, if the newly clicked device is of the same model as the device already selected ("no" in S21), the process jumps to S23 and the newly clicked device is highlighted along with the already selected devices. In this process, it is possible to select a plurality of devices of the same type displayed in the device list 201 for updating.

Figure 12:
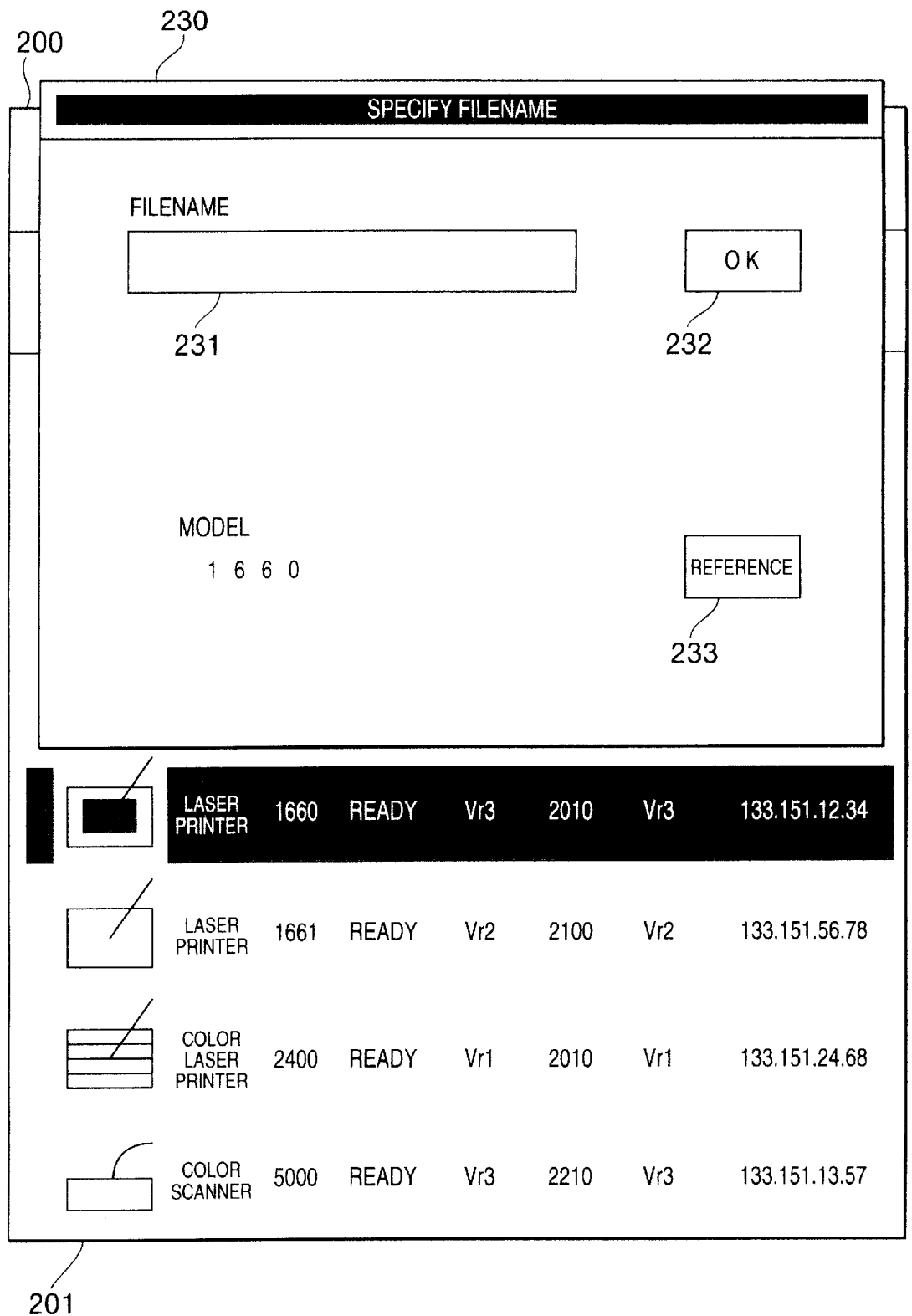
FIG. 12 is an explanatory diagram showing an example of a Filename Specifying dialog box.

After selecting the desired devices to be updated in the process described above, the user presses either the device firmware update button 202 or the NIC firmware update button 203. If the user presses the device firmware update button 202 ("yes" in S15), then in S33 the CPU 50 opens a specify filename dialog box 230, an example of which is shown in FIG. 12, and displays the specify filename dialog box 230 over the top of the device list screen 200. As shown in FIG. 12, the specify filename dialog box 230 includes the model name of the selected device, as well as a filename input box 231, an OK button 232, and a reference button 233.

After opening the specify filename dialog box 230 in S33, the CPU 50 executes a filename input/selection process in S35. This process is repeated until the CPU 50 determines in S37 that the user has pressed the OK button 232. In the filename input/selection process of S35, the CPU 50 executes the following series of processes. When the filename for the firmware is input directly from the keyboard 53, that filename is displayed in the filename input box 231. When the user presses the reference button 233, a new dialog box (not shown) is opened to display a list of firmware stored in the ROM 51, a server, or other storage device connected and in communication with the manager G. The user selects a firmware in the list using the cursor keys and the like on the keyboard 53, and the filename of the selected firmware is displayed in the filename input box 231.

Once the desired filename is displayed in the filename input box 231 according to the filename input/selection process of S35, the user presses the OK button 232. The CPU 50 recognizes that the user pressed the OK button 232 and jumps to S39. In S39, the CPU 50 executes a firmware transmission process to be described later. The firmware of the filename that was input above is transmitted to the network W by LPR, that is, with the intention of being processed only by a device such as the printer 10. When the process of S39 is completed, the specify filename dialog box 230 is closed, revealing the entire display of the device list screen 200. The processes of the loop S11–S19 are resumed.

A similar process is performed when the user presses the NIC firmware update button 203. In this case, the CPU 50 recognizes in S17 that the user has pressed the NIC firmware update button 203 ("yes" in S17) and jumps to S43. In S43, a specify filename dialog box 230 approximately the same as the example shown in FIG. 12 is opened, and the CPU repeats the filename input/selection process of S45, approximately the same as the process described above, until the user presses the OK button 232 in S47. However, the specify filename dialog box 230 displayed in S43 differs from the dialog box shown in FIG. 12 in that the NIC model name (2010 in the example above) is displayed as the model name.

After the desired filename is displayed according to the filename input/selection process of S45, the user presses the OK button 232. The CPU 50 determines that the user has pressed the OK button 232 in S47 and jumps to S49. In S49, the CPU 50 executes a firmware transmission process, transmitting to the network W firmware for the filename inputted above. The firmware is transmitted by TFTP, indicating that it is to be processed only by the NIC. After the process of S49 is completed, the specify filename dialog box 230 is closed and the processes in the loop S11–S19 are resumed. When the end button 205 is pressed during this loop, the CPU ends the updating process.

Figure 6:
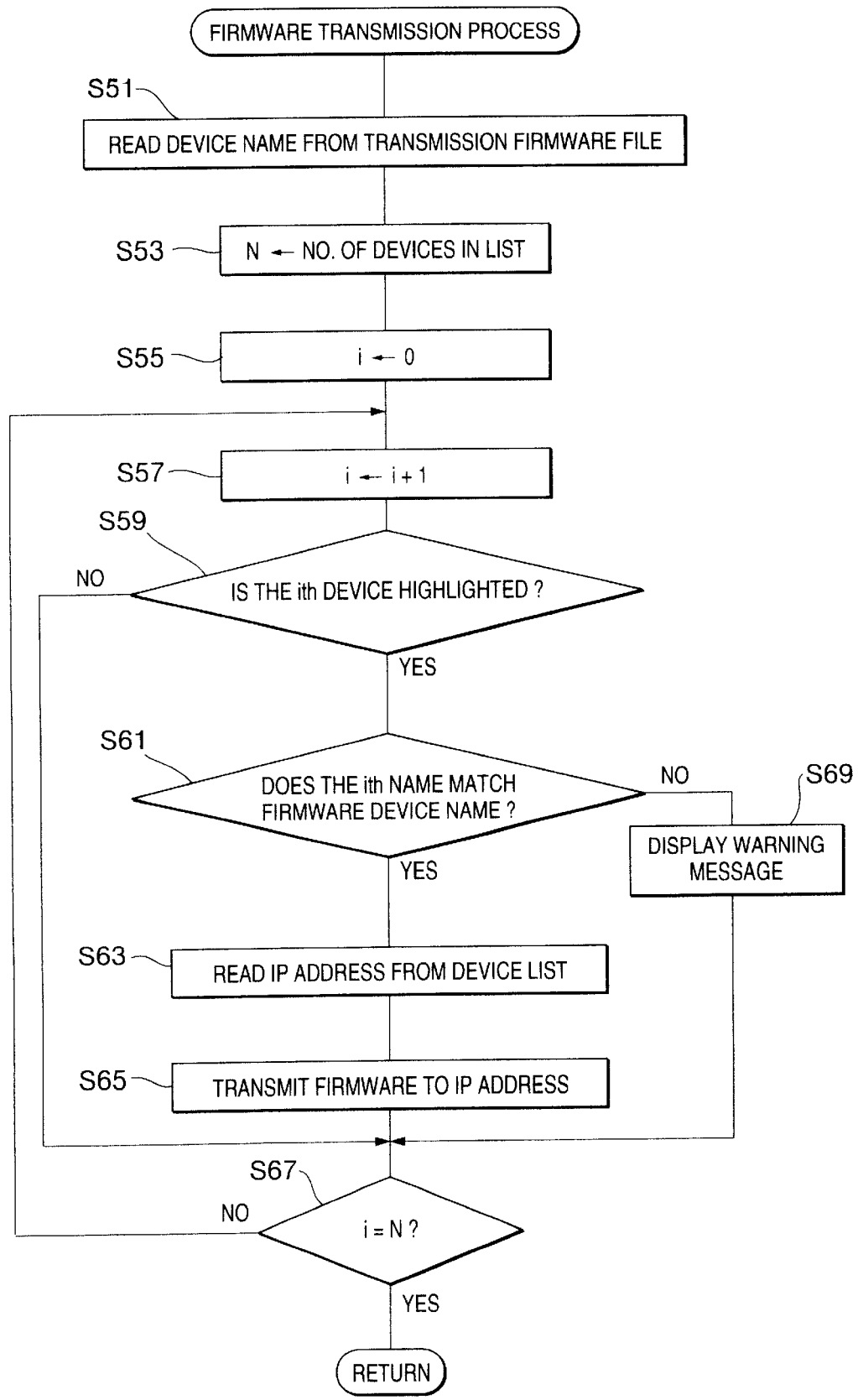
FIG. 6 is a flowchart showing a firmware transmitting process performed within the updating process.

FIG. 6 is a flowchart showing the firmware transmission process. As shown in FIG. 6, the process begins in S51 by reading the device name from the transmission firmware file. For each firmware to be used in this updating process, a transmission firmware file 300, such as the example shown in FIG. 13(a), is created. As shown in the example of FIG. 13(a), the transmission firmware file 300 is constructed of a device name 301 appropriate to that firmware; a ROM (ROM 12 of the printer 10 or ROM 6 of the NIC 1) address 302 at which the firmware is stored; a firmware 303 that is the firmware process program; a rewrite program 304 for overwriting the rewritable storage area 6a or rewritable storage area 12a of the ROM 6 or ROM 12, respectively, which store this firmware 303; and a control program 305 for executing processes and the like for copying the rewrite program 304 described later.

In S51, the device name 301 is read from the transmission firmware file 300 corresponding to the filename selected in either S35 or S45. In S53, the CPU 50 detects the total number of devices displayed in the device list 201 and assigns that value to the variable N. In S55, a variable i is reset to 0. In S57, i is incremented by 1. In S59, the CPU 50 determines whether the i-th device in the device list 201 has been selected and highlighted. If the i-th device is highlighted ("yes" in S59), the process jumps to S61. In S61, the 50 determines whether the device name of the i-th device displayed in the device list 201 matches the device name 301 of the firmware read in S51.

If the two device names match ("yes" in S61), then the IP address for that device is read in S63 from the device list 201, and in S65 the transmission firmware file 300 is transmitted to that IP address via the network W. As described above, in S65 the transmission firmware file 300 having the firmware 303 to be written to the rewritable storage area 6a of the ROM 6 is transmitted by TFTP, while the transmission firmware file 300 having a firmware 303 to be written to the rewritable storage area 12a of the ROM 12 is transmitted by LPR.

Figure 13:
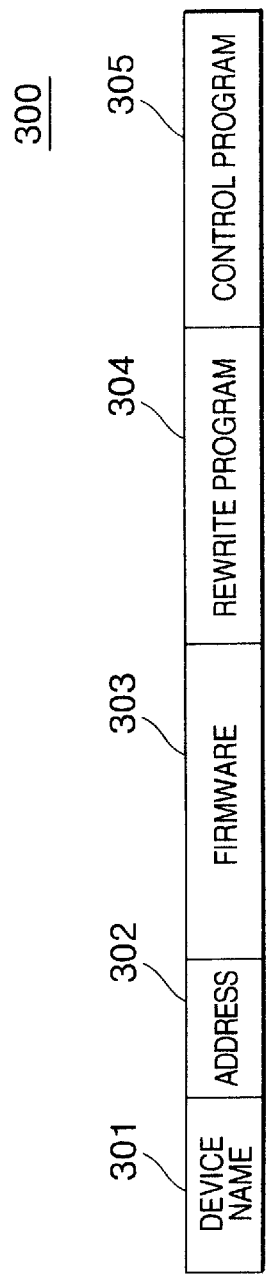
FIG. 13(*a*) is an explanatory diagram showing the format of a transmission firmware file.
Figure 13:
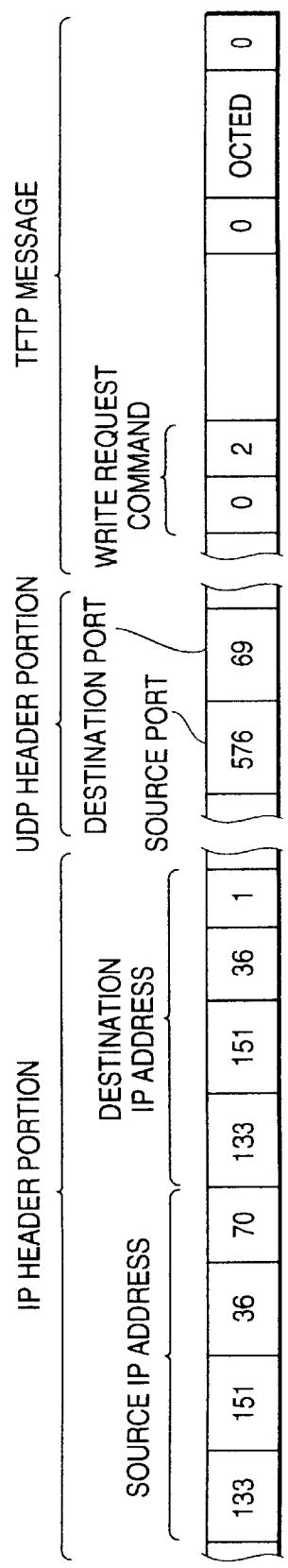

As is well known in the art, transfer parameters in TFTP include parameters representing Put or Get (transmit or receive); an IP address for the destinations a pathname for the source firmware file; and a pathname for the destination firmware file. However, since in general the NIC 1 does not have a filename system, the pathname for the destination firmware file is of no use. In the present embodiment, therefore, a password specific to the manager G is added in place of this pathname, as shown in FIG. 13(*b*). The effects of this password will be described later.

After transmitting the transmission firmware file 300, the CPU jumps to S67 and determines whether i=N, that is, whether processing for all devices is completed. If i=N ("no" in S67), the CPU 50 returns to S57 and increments i by 1. The same process is then repeated for the next device. At this time, if the i-th device is not highlighted ("no" in S59), the CPU jumps to S67 and again determines whether i=N. If i does not equal N (now in S67), the CPU 50 returns to S57 and repeats the process for the next device. This is process is repeated until i=N, indicating that the processing has been completed for all devices. When the CPU determines that i=N ("yes" in S67), the process is ended and the CPU returns to the process of FIG. 5.

Figure 14:
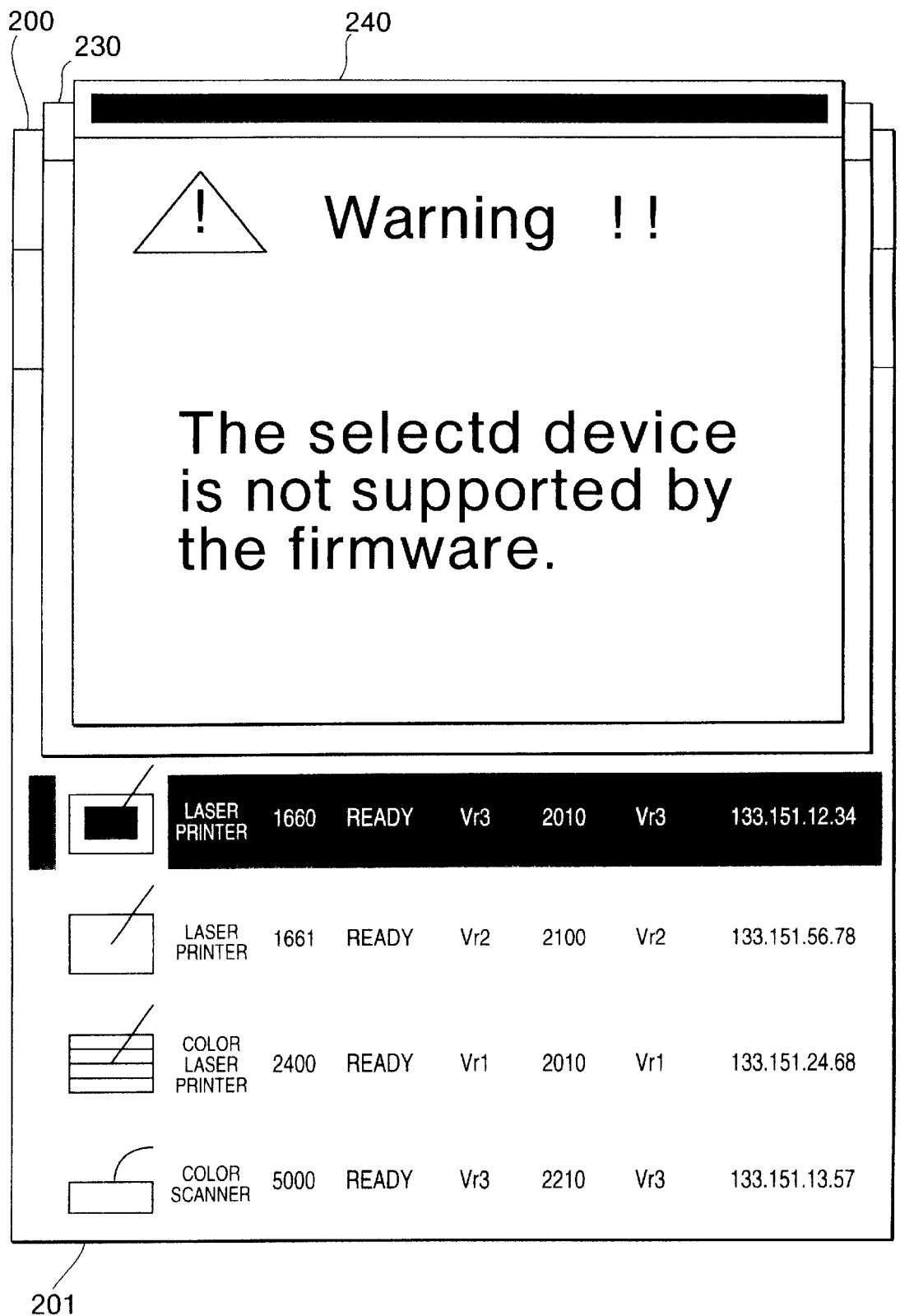
FIG. 14 is an explanatory diagram showing an example of a warning message.

In the process described above, it is possible to transmit the transmission firmware file 300 having the firmware 303 selected in either S35 or S45 for all devices (or NICs connected to those devices) highlighted in the device list 201. However, if the CPU determines in S61 that the device name of the i-th device does not match the device name 301 of the firmware read in S51 ("no" in S61), then the CPU jumps to S69. In S69, a warning message 240, such as the example shown in FIG. 14, is displayed over the top of the specify filename dialog box 230 still being displayed on the screen. In this case, the CPU jumps to S67 without transmitting the transmission firmware file 300 in the processes of S63 and S65. Accordingly, it is possible to adequately prevent the transmission of a transmission firmware file 300 not suitable for the firmware 303.

In this way, it is possible to create a list in the device list 201 of the manager G indicating the devices to which the transmission firmware file 300 can be transmitted. Further, when selecting devices as targets of the transmission firmware file 300, the user can either select the devices individually or select all the devices of the same type. As a result, it is extremely easy to select devices to be updated, thereby greatly improving productivity of the communication system S. Moreover, since the warning message 240 is displayed when the selected device does not match the firmware 303, it is possible to adequately prevent the transmission firmware file 300 from being transmitted to an incompatible device, which can result in incorrect operations or the occurrence of other error messages.

Next, the process executed by the CPU 11 of the printer 10 will be described.

Figure 15:
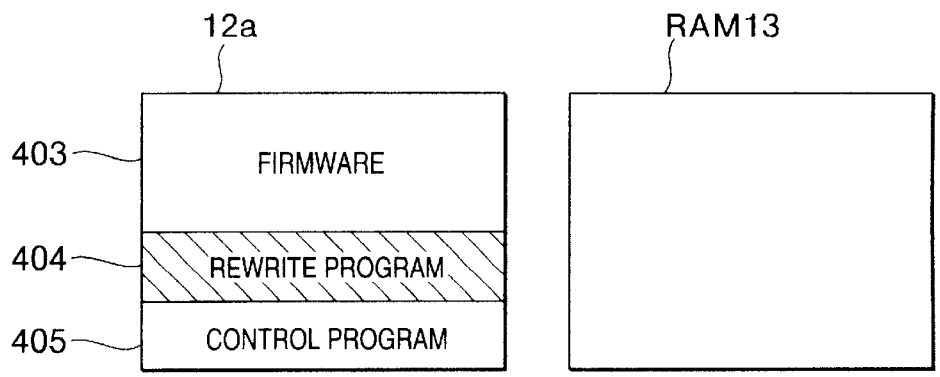
FIG. 15(*a*) is an explanatory diagram showing memory areas in the printer during the updating process.
Figure 15:
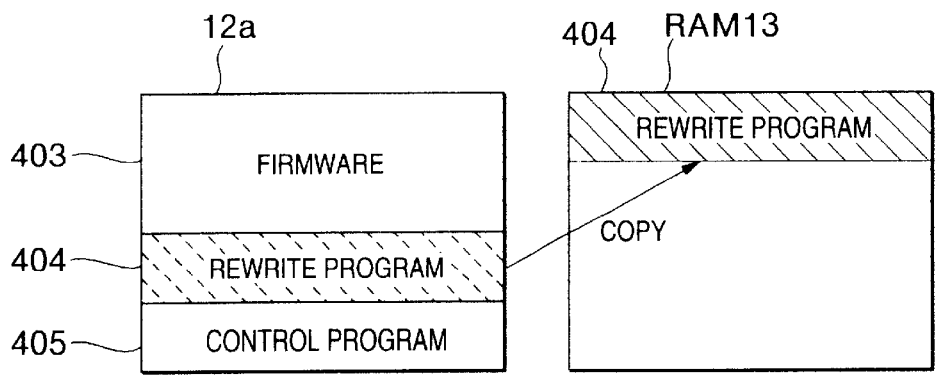
Figure 15:
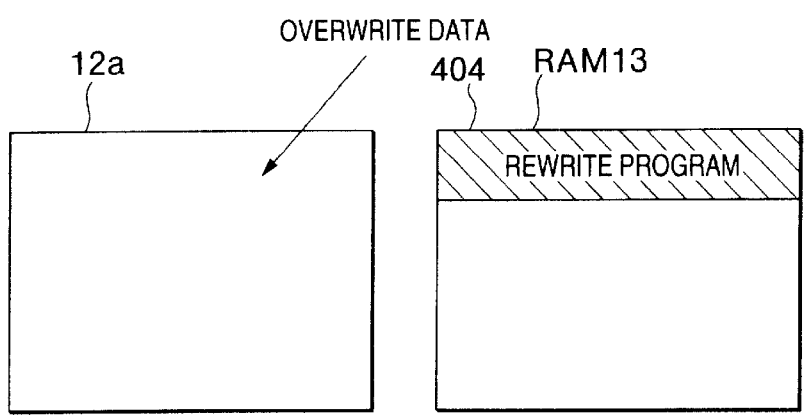

As shown in the example of FIG. 15(*a*), the rewritable storage area 12a of the ROM 12 stores a firmware 403 that is a small processing program for controlling the printing section 17 and the like; a rewrite program 404 for overwriting the contents of the rewritable storage area 12a, which stores the firmware 403 and the like; and a control program 405 for processes such as copying the rewrite program 404 to the RAM 13.

Figure 16:
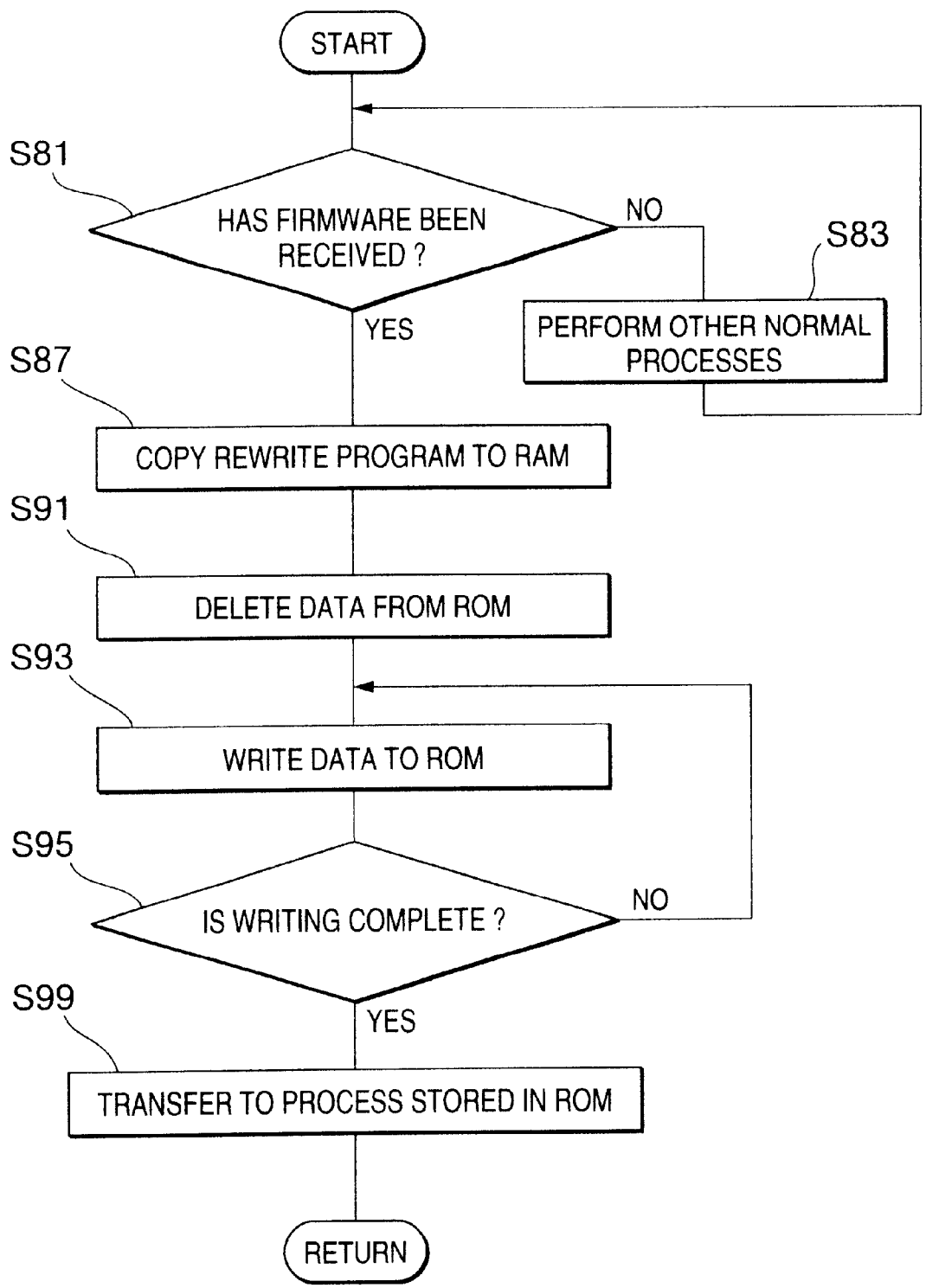
FIG. 16 is a flowchart showing the updating process executed by the printer.

The CPU 11 executes the following processes based on the control program 405. FIG. 16 is a flowchart showing the updating process executed by the CPU 11 of the printer 10. As shown in FIG. 16, at the beginning of the process in S81, the CPU 11 determines whether the transmission firmware file 300 has been received. If the transmission firmware file 300 has not been received ("no" in S81), normal processes are executed in S83 and the CPU 11 returns to S81. In other words, the printer 10 executes normal processes in S83 based on the firmware 403 stored in the rewritable storage area 12a and other rewritable process programs stored in the ROM 12 until the printer 10 receives the transmission firmware file 300 from the manager G via the network W.

The normal processes mentioned above include processes well known in the art, such as driving the printing section 17, as well as returning the device data 100 in response to a device data request sent by the manager G in S1. A header and the like (not shown) in the transmission firmware file 300 includes instruction data for indicating that the data is the transmission firmware file 300. By detecting this instruction data, the CPU 11 can determine that firmware was received in S81.

When the printer 10 receives the transmission firmware file 300 ("yes" in S81), the process continues in S87. As shown in the example of FIG. 15(*b*), the rewrite program 404 is copied into the RAM 13. Next, the processes in S91–S99 are executed as described below based on the rewrite program 404 copied to the RAM 13. As shown in the example of FIG. 15(*c*), the data stored in the rewritable storage area 12a is overwritten and the process ends.

That is, in S91 data stored in the rewritable storage area 12a of the ROM 12 is deleted. In S93, data for the received transmission firmware file 300 (firmware 303, rewrite program 304, and control program 305) is written to the rewritable storage area 12a of the ROM 12. In S95, the CPU 11 determines whether the writing is completed. The process of S93 is repeated as long as the writing is not completed ("no" in S95). When the writing is completed ("yes" in S95), the CPU 11 jumps to the process stored in the ROM 12 (for example, the process to reset the printer 10) and the process is ended. At this time, the printer can execute normal processes based on the firmware 303 newly stored in the rewritable storage area 12a and other rewritable process programs stored in the ROM 12.

In this way, the printer 10 temporarily copies the rewrite program 404 to the RAM 13 and subsequently overwrites the contents of the ROM 12 based on the rewrite program 404. Hence, it is possible to overwrite the entire contents of the ROM 12 at once using one rewrite program 404. Accordingly, it is possible to simplify the mechanical construction of the printer 10 and the construction of the control system and make effective use of the storage capacity of the ROM 12. It is also possible to shorten the processing time needed for overwriting. Further, since the rewrite program 304 and control program 305 are stored in the ROM 12 in the same way, it is possible to perform the above described overwrite process in the same way when another transmission firmware file is received by the printer 10.

When the CPU 11 receives the transmission firmware file 300 ("yes" in S81), the processes S87–S95 are automatically executed to overwrite the rewritable storage area 12a. When the writing is completed ("yes" in S95), the CPU can be automatically instructed to perform normal processes based on the ROM 12. Hence, it is extremely easy to overwrite the rewritable storage area 12a and it is possible to very quickly return to normal control following the overwrite process. As a result, operability of the printer 10 is improved considerably.

In the same manner as described above, firmware, rewrite programs, and control programs are stored in the rewritable storage area 6a of the ROM 6. The contents of the ROM 6 can be overwritten entirely by the same process described above. Moreover, it is possible to automatically begin writing and return to normal processes in the same way described above. However, processes performed in the NIC 1 differ from those described above in that the transmission firmware file 300 is directed according to whether the transmission firmware file 300 was transmitted by TFTP or by LPR.

Figure 17:
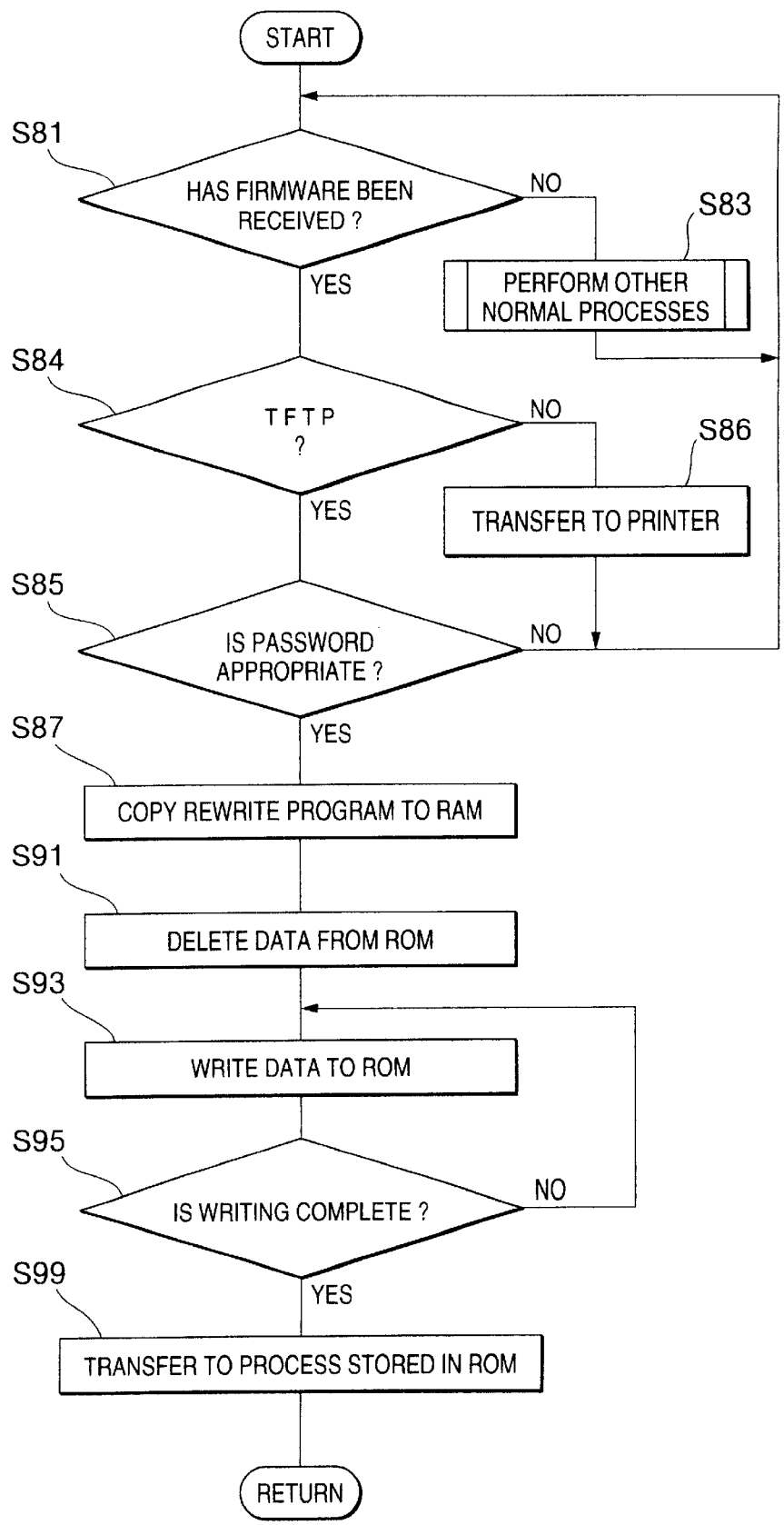
FIG. 17 is a flowchart showing the updating process executed by the NIC.

FIG. 17 is a flowchart showing an updating process executed by the CPU 5 in the NIC 1. As shown in FIG. 17, the updating process is approximately the same as the process shown in FIG. 16, differing only in that the process of FIG. 17 has additional processes between S81 and S87 described here. That is, when the CPU 5 determines in S81 that the transmission firmware file 300 has been received, then in S84 the CPU 5 determines whether the transmission firmware file 300 was sent by TFTP. If the transmission firmware file 300 was sent by TFTP ("yes" in S84), then the CPU 5 determines in S85 whether the password added to the transmission firmware file 300 is appropriate, that is, whether the password is specific to the manager G. If the transmission firmware file 300 was transmitted by TFTP ("yes" in S84) and an appropriate password has been added in place of the pathname in the transfer parameters ("yes" in S85), then the processes beginning in S87 are executed to overwrite the contents of the ROM 6, as described above.

However, if the transmission firmware file 300 was transmitted by another protocol such as LPR ("no" in S84), then the transmission firmware file 300 is transferred to the printer 10 in S86 without change. In the processes in the loop of S81 and S83 are resumed until another transmission firmware file 300 is received. Further, if the password added to the transmission firmware file 300 is not appropriate ("no" in S85), then the CPU 5 returns to the processes in the loop of S81 and S83 and discards the transmission firmware file 300 received in S81.

As described in reference to S65 shown in FIG. 6, the manager G transmits a transmission firmware file 300 to be overwritten to the rewritable storage area 6a of the ROM 6 using TFTP and a transmission firmware file 300 to be overwritten to the rewritable storage area 12a of the ROM 12 using LPR. Therefore, the transmission firmware file 300 can be directed in the NIC 1 based on whether the transmission firmware file 300 was transmitted by TFTP or by LPR. The transmission firmware file 300 transferred to the printer 10 is overwritten to the rewritable storage area 12a according to the processes of FIG. 16 described above, achieving the following effects.

Since the protocol is used to determine whether the firmware 303 should be written to the NIC 1 or to a device, there is no need to add data such as an identifier to the transmission firmware file 300 to indicate the type of firmware 303. As a result, it is possible to simplify the transmission process and construction of the device and to reduce production costs, as well as to improve the processing speed.

The manager G transmits a transmission firmware file 300 to be transferred to the printer 10 using the well-known LPR protocol, which is the protocol used to transmit image data for printing by the printing section 17. For this reason, it is possible to direct the data by transferring all data determined in the NIC 1 to be sent by LPR, regardless of the type of data, to the printer 10. Accordingly, it is possible to simplify the process and construction of the NIC 1, to further improve the process speed of the NIC 1, and also to improve production costs.

Since overwriting the ROM 6 in the NIC 1 is authorized only when the password attached to the transmission firmware file 300 is appropriate, it is possible to reasonably prevent data other than firmware or programs transmitted by the manager G and firmware and the like addressed to the printer 10 from being written to the ROM 6. In particular, if inappropriate firmware is received from another computer and written to the ROM 6 of the NIC 1, it is possible that all transmission and reception with the manager G will be rendered impossible. A system according to the present embodiment, however, can adequately prevent this situation from occurring. Moreover, since the embodiment of the present invention can achieve these effects in a simple data system that merely attaches a password in place of the TFTP pathname, the present invention can simplify the construction of the communication system and increase its reliability.

In the embodiment described above, the NIC 1 and the printer 10 in the communication system S are capable of overwriting the contents of the ROM 6 or ROM 12 in one step according to a single rewrite program. As a result, it is possible to simplify the mechanical construction of the device and the construction of the control system and to effectively utilize the storage capacities of the ROM 6 and ROM 12, as well as to reduce the processing time needed for overwriting. Moreover, the device list screen 200 provides an extremely easy method of selecting a processing device to be overwritten. In addition, it is possible to reliably direct the transmission firmware file 300 to transmitted to the NIC 1 or the printer 10.

In the embodiment described above, the NIC 1 and printer 10 are described as being connected in a one-to-one relationship. However, as shown in FIG. 1, the printer 40 and the image scanner 70, for example, can be connected in parallel to the NIC 1. Further, it is possible to connect the intelligent (having its own CPU) paper sorter 80 to the printer 40. In this case, the printer 40 acquires the device data from both the paper sorter 80 and the NIC 1. The data is attached to the device data 100 shown in FIG. 7 and returned to the manager G.

While the invention has been described in detail with reference to specific embodiments thereof, it would be apparent to those skilled in the art that many modifications and variations may be made therein without departing from the spirit of the invention, the scope of which is defined by the attached claims.

Figure 18:
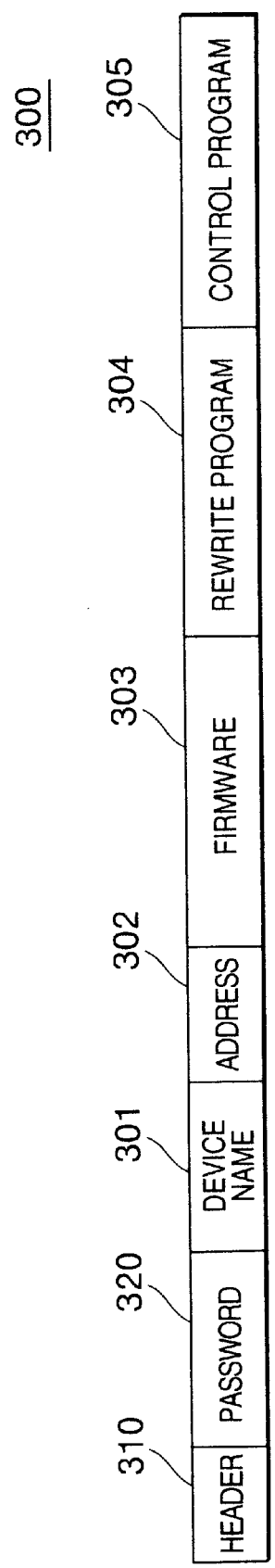
FIG. 18 is an explanatory diagram showing another format of the transmission firmware file.
Figure 19:
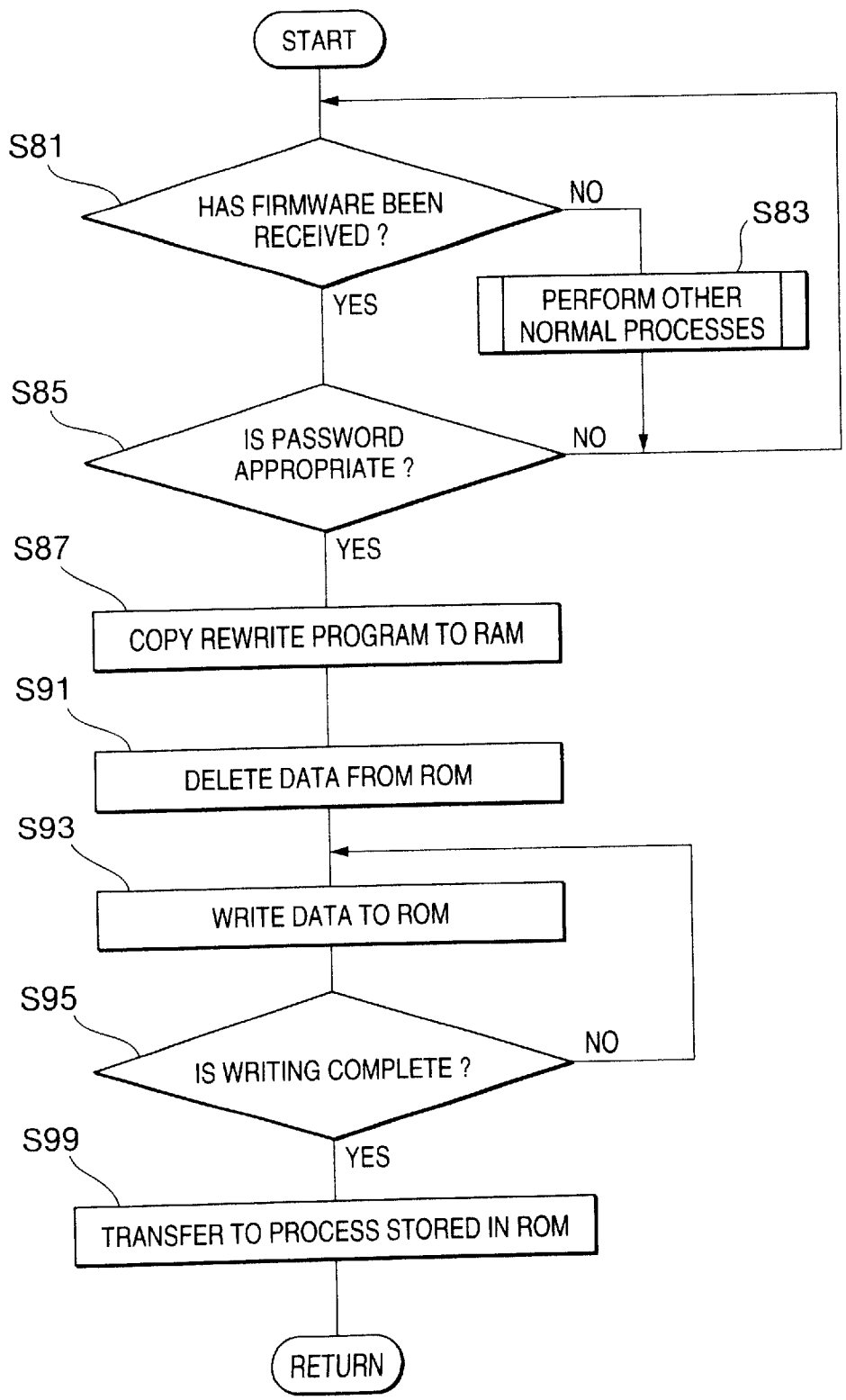
FIG. 19 is a flowchart showing another example of the updating process executed by the printer.

For example, in the embodiment described above, the check performed on the password in S85 is performed only in the updating process of the NIC 1. However, this password checking process can also be performed in the updating process of the printer 10 and the like. As shown in FIG. 18, this process can be executed by inserting a password between the various data of the transmission firmware file 300 (device name 301, ROM address 302, firmware 303, rewrite program 304, and control program 305) and a header 310 of the transmission firmware file 300 (not shown in FIG. 13(a)). Further, as shown in FIG. 19, the process of S85 described in FIG. 17 for determining whether the password is appropriate is inserted between S81 and S87 of FIG. 16. This configuration enables the printer 10 and the like to sufficiently prevent data other than firmware or programs sent from the manager G from being written to the ROM 12. In addition, this password can be incorporated in the header 310 or in the other data 301–305.

The storage medium for storing the above described determining processes, data transmission processes, and the like can be of other forms than the ROM and RAM components described, providing the storage medium can be read by the manager G. For example, the storage medium can be a CD-ROM, floppy disk, or the like; a program cartridge and the like that can be inserted in a card slot; or a file server connected to the Internet.

The present invention is not limited to a data communication system centering on an image forming device such as the printer 10, but can also apply to other types of communication systems, including a communication karaoke system and the like The present invention can also be applied to a simple data communication system, such as a single personal computer connected to a single printer via an NIC. In this type of data communication system, data can be directed as described above.

What is claimed is:

1. A data communication system, comprising:

a data transmission device that transmits data;

an interface device that receives the data from the data transmission device; and a data reception device that receives via the interface device at least a portion of the data from the data transmission device, wherein the data transmission device further comprises:
      determining means for determining the data to be transmitted by the data transmission device is first data to be processed by said interface device or second data to be processed by the data reception device;

designating means for designating a first communication protocol for the data to be transmitted by the data transmission device when the data is the first data, and for designating a second communication protocol different from the first communication protocol for the data to be transmitted by the data transmission device when the data is the second data; and transmitting means for transmitting the data in the first communication protocol if designated the data is to be transmitted in the first communication protocol, and for transmitting the data in the second communication protocol if designated the data is to be transmitted in the second communication protocol;

wherein the interface device further comprises:
      data receiving means for receiving the data transmitted from the data transmission device;
      protocol judging means for judging that the data received by the data receiving means is the first data transmitted in the first communication protocol or the second data transmitted in the second communication protocol;

data processing means for processing the data without transferring the data to the data reception device if judged the data is transmitted in the first communication protocol; and data transferring means for transferring the data to the data reception device if judged the data is transmitted in the second communication protocol.

2. The data communication system according to claim 1, wherein said interface device comprises a first programmable ROM having a rewritable storage area; a first CPU that executes processes based on processing programs stored in the rewritable storage area; and a first RAM that temporarily stores data necessary for said first CPU to execute the processes, said data reception device comprises a second programmable ROM having a rewritable storage area; a second CPU that executes processes based on processing programs stored in the rewritable storage area of said second programmable ROM; and a second RAM that temporarily stores data necessary for said second CPU to execute the processes, wherein data transmitted using the first communication protocol includes new processing programs to be written to the rewritable storage area of said first programmable ROM and data transmitted using the second communication protocol includes now processing programs to be written to the rewritable storage area of said second programmable ROM.

3. The data communication system according to claim 2, wherein said data reception device comprises an image forming device that forms an image on a recording medium based on image data received via said interface device, wherein the second communication protocol is used for transmitting the image data to said data reception device.

4. The data communication system according to claim 2, wherein said data transmission device assigns a password to the new processing programs when transmitting the new processing programs using the first communication protocol, and wherein said interface device writes the new processing programs to the rewritable storage area of said first programmable ROM only when the password has been assigned to the new processing program.

5. The data communication system according to claim 4, wherein trivial file transmission protocol (TFTP) is used as the first communication protocol.

6. The data communication system according to claim 2, wherein said data transmission device assigns a password to the new processing programs when transmitting the new processing programs using the second communication protocol, and wherein said data reception device writes the new processing programs to the rewritable storage area of said second programmable ROM only when the password has been assigned to the new processing program.

7. The data communication system according to claim 6, wherein line printer remote (LPR) is used as the second communication protocol.

8. An interface device, connected to a communication line and a data reception device, comprising:

data receiving means for receiving data transmitted from the communication line;

protocol judging means for judging the data received by the data receiving means is transmitted in a first communication protocol or a second communication protocol different from the first communication protocol;

data processing means for processing the data without transferring the data to the data reception device if judged the data is transmitted in the first communication protocol; and data transferring means for transferring the data to the data reception device if judged the data is transmitted in the second communication protocol.

9. The interface device according to claim 8, wherein said data processing means comprises a programmable ROM having a rewritable storage area; a CPU that executes processes based on processing programs stored in the rewritable storage area; and a RAM that temporarily stores data necessary for said CPU to execute the processes, wherein data transmitted using the first communication protocol includes new processing programs to be written to the rewritable storage area of said programmable ROM.

10. The interface device according to claim 9, wherein the new processing programs received from the communication line by the first communication protocol include a password, and the new processing programs are written to the rewritable storage area of said programmable ROM only when the password is included in the new processing program.

11. The interface device data according to claim 8, wherein trivial file transmission protocol (TFTP) is used as the first communication protocol.

* * * * *